(12) United States Patent
Jones et al.

(10) Patent No.: US 7,908,251 B2
(45) Date of Patent: Mar. 15, 2011

(54) QUORUM-BASED POWER-DOWN OF UNRESPONSIVE SERVERS IN A COMPUTER CLUSTER

(75) Inventors: Christopher Henry Jones, Rochester, MN (US); William T. Newport, Rochester, MN (US); Graham Derek Wallis, West Wellow (GB)

(73) Assignee: International Business Machines Corporation, Armonk, NY (US)

(*) Notice: Subject to any disclaimer, the term of this patent is extended or adjusted under 35 U.S.C. 154(b) by 389 days.

(21) Appl. No.: 12/192,291

(22) Filed: Aug. 15, 2008

(65) Prior Publication Data

US 2008/0301491 A1 Dec. 4, 2008

Related U.S. Application Data

(63) Continuation of application No. 10/981,020, filed on Nov. 4, 2004, now abandoned.

(51) Int. Cl.
*G06F 17/00* (2006.01)
*G06F 7/00* (2006.01)
(52) U.S. Cl. ........ 707/674; 707/610; 707/737; 707/955; 709/201; 709/223; 709/249; 713/310; 713/324
(58) Field of Classification Search .................. None
See application file for complete search history.

(56) References Cited

U.S. PATENT DOCUMENTS

| | | | |
|---|---|---|---|
| 6,081,812 A | 6/2000 | Boggs et al. |
| 6,363,495 B1 | 3/2002 | MacKenzie et al. |
| 6,587,950 B1 | 7/2003 | Shah et al. |
| 6,938,084 B2 | 8/2005 | Gamache et al. |
| 6,944,662 B2 | 9/2005 | Devine et al. |
| 6,950,833 B2 | 9/2005 | Costello et al. |
| 7,016,946 B2 | 3/2006 | Shirriff |
| 7,024,580 B2 | 4/2006 | Guimbellot et al. |
| 2002/0095470 A1 | 7/2002 | Cochran et al. |
| 2002/0145983 A1 | 10/2002 | Block et al. |
| 2005/0216442 A1 | 9/2005 | Liskov et al. |
| 2006/0080569 A1 | 4/2006 | Sciacca |
| 2006/0090095 A1 | 4/2006 | Massa et al. |
| 2006/0235952 A1 | 10/2006 | Jacobs et al. |
| 2007/0016822 A1 | 1/2007 | Rao et al. |

*Primary Examiner* — Greta L Robinson
*Assistant Examiner* — James J Wilcox
(74) *Attorney, Agent, or Firm* — Martin & Associates, LLC; Derek P. Martin

(57) ABSTRACT

A quorum-based server power-down mechanism allows a manager in a computer cluster to power-down unresponsive servers in a manner that assures that an unresponsive server does not become responsive again. In order for a manager in a cluster to power down servers in the cluster, the cluster must have quorum, meaning that a majority of the computers in the cluster must be responsive. If the cluster has quorum, and if the manager server did not fail, the manager causes the failed server(s) to be powered down. If the manager server did fail, the new manager causes all unresponsive servers in the cluster to be powered down. If the power-down is successful, the resources on the failed server(s) may be failed over to other servers in the cluster that were not powered down. If the power-down is not successful, the cluster is disabled.

3 Claims, 4 Drawing Sheets

QUORUM-BASED POWER-DOWN OF UNRESPONSIVE SERVERS IN A COMPUTER CLUSTER

CROSS-REFERENCE TO PARENT APPLICATION

This patent application is a continuation of U.S. Ser. No. 10/981,020 filed on Nov. 4, 2004, which is incorporated herein by reference.

BACKGROUND OF THE INVENTION

1. Technical Field

This invention generally relates to data processing, and more specifically relates to networked computer systems.

2. Background Art

Since the dawn of the computer age, computer systems have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Networked computers are capable of performing tasks that no single computer could perform. In addition, networks allow low cost personal computer systems to connect to larger systems to perform tasks that such low cost systems could not perform alone. Most companies in the United States today have one or more computer networks. The topology and size of the networks may vary according to the computer systems being networked and the design of the system administrator. It is very common, in fact, for companies to have multiple computer networks. Many large companies have a sophisticated blend of local area networks (LANs) and wide area networks (WANs) that effectively connect most computers in the company to each other.

With multiple computers hooked together on a network, it soon became apparent that networked computers could be used to complete tasks by delegating different portions of the task to different computers on the network, which can then process their respective portions in parallel. In one specific configuration for shared computing on a network, the concept of a computer "cluster" has been used to define groups of computer systems on the network that can work in parallel on different portions of a task.

Clusters of computer systems have also been used to provide high-reliability services. The high reliability is provided by allowing services on a server that fails to be moved to a server that is still alive. This type of fault-tolerance is very desirable for many companies, such as those that do a significant amount of e-commerce. In order to provide high-reliability services, there must be some mechanism in place to detect when one of the servers in the cluster becomes inoperative. One known way to determine whether all the servers in a cluster are operative is to have each server periodically issue a message to the other servers indicating that the server that sent the message is still alive and well. These types of messages are commonly referred to in the art as "heartbeats" because as long as the messages continue (i.e., as long as the heart is still beating), we know the server is still alive.

In the prior art, when a server becomes invisible due to lack of a heartbeat, a server in the cluster that is designated as a manager assumes the server that no longer has a heartbeat has failed. As a result, the manager must provide the resources that were on the failed server on another server in the cluster. Note, however, that the absence of a heartbeat does not always mean a server is dead. For example, a server may not provide a heartbeat because it may be temporarily unresponsive due to trashing, swapping, network floods, etc. If the server is not giving heartbeats but is still alive, there exists the possibility that the server may once again become responsive and start providing heartbeats. If the manager has already assumed the server has failed, and has provided the server's services on another server, we now have two servers that try to provide the same services. This creates a problem in administrating the cluster. One way to deal with this problem is to monitor data for a service to make sure that two servers don't try to access the same data for the same service. However, this is complex and inefficient. Without a mechanism for assuring that services in a computer cluster are not duplicated when a server failure is detected, the computer industry will continue to suffer from inadequate and inefficient ways of handling a failed server in a computer cluster.

DISCLOSURE OF INVENTION

An apparatus and method provide a quorum-based server power-down mechanism that allows a manager in a computer cluster to power-down unresponsive servers in a manner that assures that an unresponsive server does not become responsive again. In order for a manager in a cluster to power down servers in the cluster, the cluster must have quorum, meaning that a majority of the computers in the cluster must be responsive. If the cluster has quorum, and if the manager server did not fail, the manager causes the failed server(s) to be powered down. If the manager server did fail, the new manager causes all unresponsive servers in the cluster to be powered down. If the power-down is successful, the resources on the failed server(s) may be failed over to other servers in the cluster that were not powered down. If the power-down is not successful, the cluster is disabled.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

According to preferred embodiments of the present invention, a quorum-based server power-down mechanism in a computer cluster assures that an unresponsive server in the cluster is powered-down before the resources are failed over to one or more other responsive servers. The power-down mechanism is quorum-based, meaning that only a cluster that includes a majority of the servers in the cluster may perform power-down operations. By powering down failed servers, the preferred embodiments assure that a failed system does not become responsive again.

Figure 4:
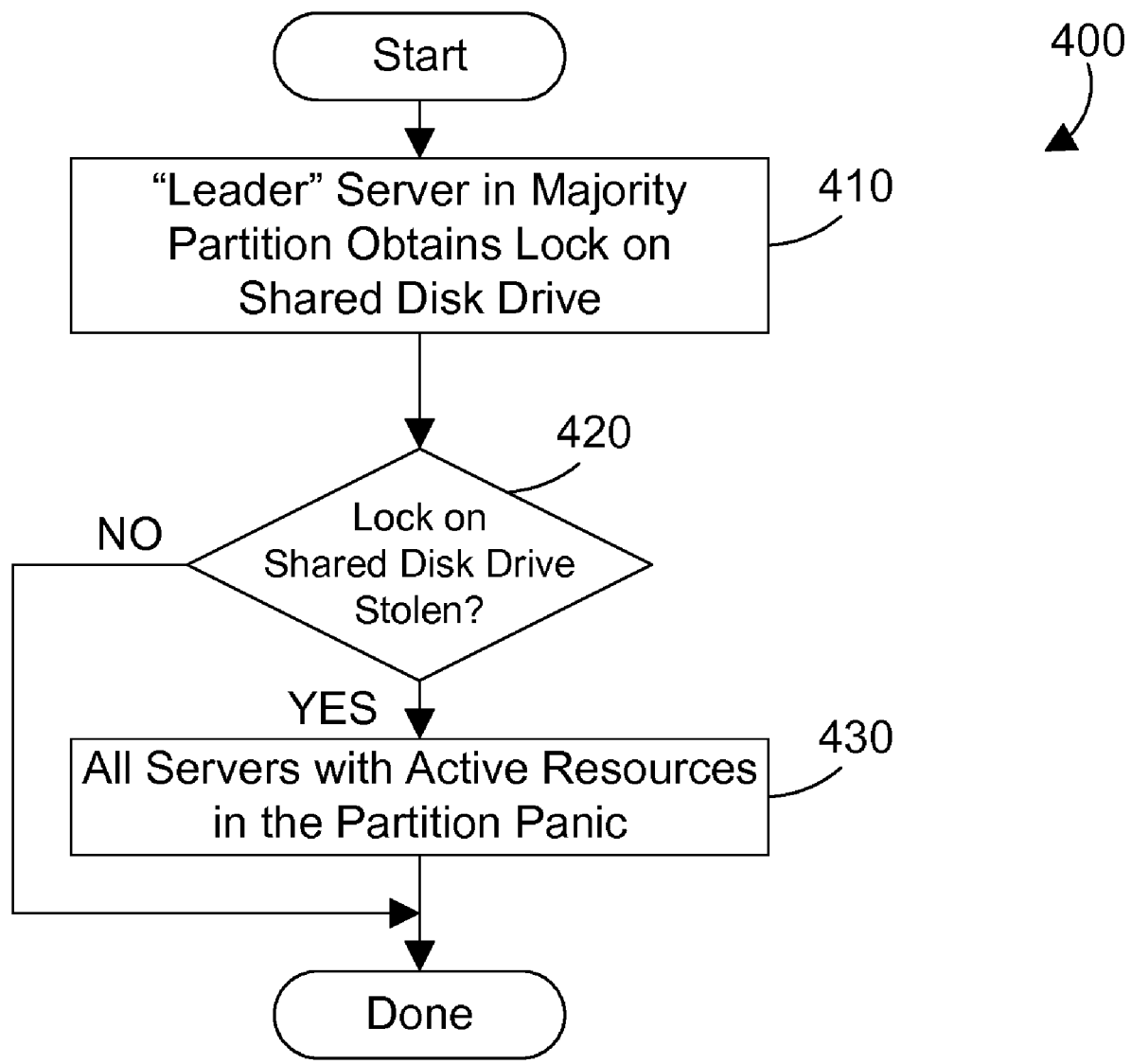
FIG. 4 is a prior art method for a server to shut itself down based on the loss of lock on a shared disk drive.

The prior art provides a way for a server in a cluster to determine when it has become unresponsive, and to know it needs to shut down. Method 400 in FIG. 4 shows the steps in one known method in the art that uses a shared disk drive. When different computer systems in a cluster share a disk drive, there is typically a locking mechanism on the disk drive to assure only one server can access the disk drive at any given time. A set of servers that are visible to each other using some membership algorithm will elect a leader and this leader will obtain the lock on the disk drive. If the set of servers split into partitions because of a communication fault, then the majority partition will obtain a lock on the shared disk drive (step 410). A majority partition is determined with a voting system. This will cause the original leader to detect that the lock on the shared disk drive has been stolen (step 420=YES), and the servers in the original partition will panic as a result (step 430). The panic may result in powering down the server or panicking the operating system kernel.

The check for a majority partition is necessary because different partitions will realize that we have partitioned in an asynchronous manner. If no partition had a majority then each partition will panic any servers with resources active. While method 400 in FIG. 4 is somewhat effective for servers that share a disk drive, the trend in the industry is to get away from sharing resources between servers in a cluster. In addition, some servers in a cluster may not need shared storage, making method 400 inapplicable to such servers. As a result, a method is needed to know when a server fails, and to take appropriate action to assure the server is dead when it is unresponsive.

Figure 1:
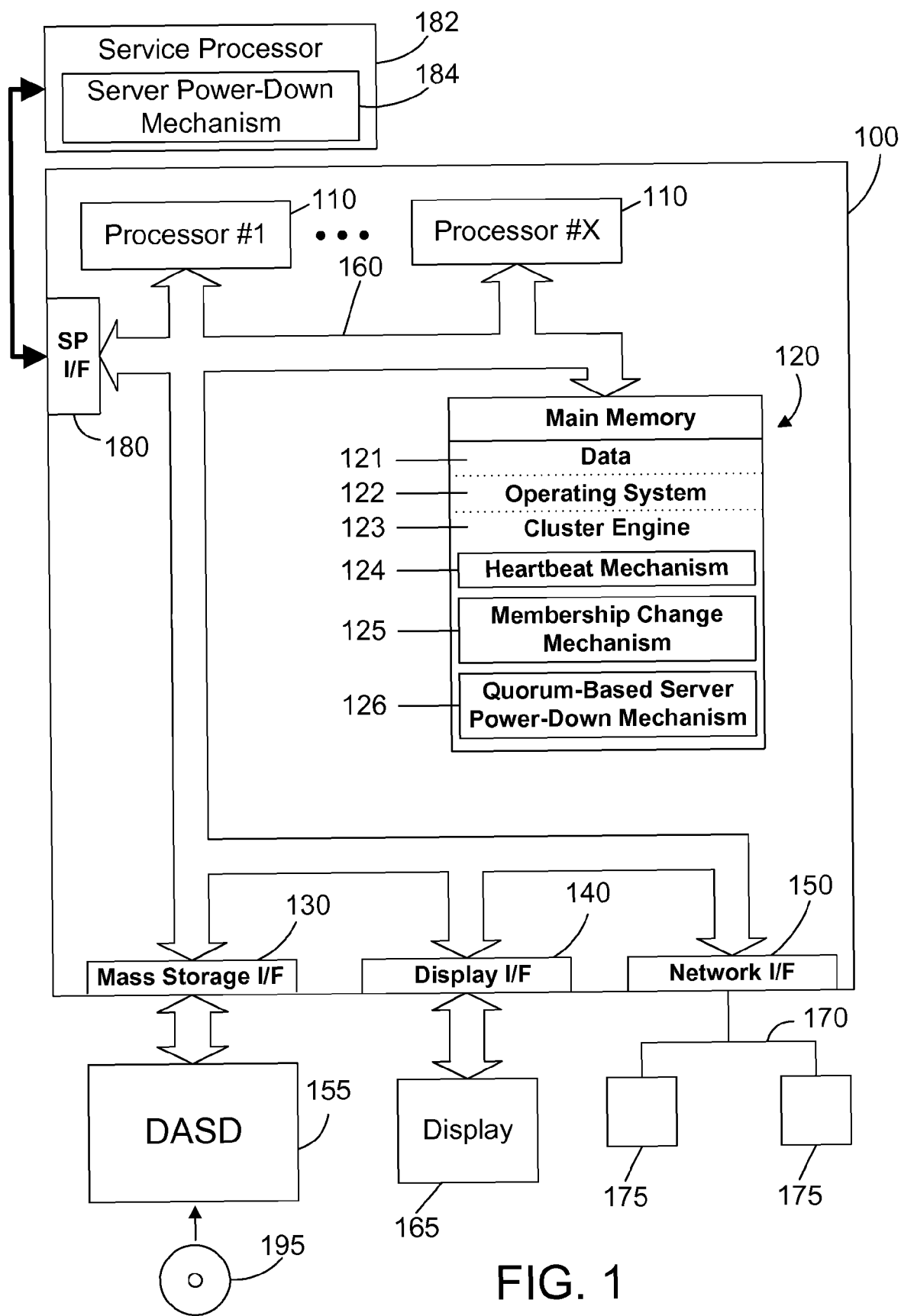
FIG. 1 is a block diagram of a computer apparatus in accordance with the preferred embodiments.

Referring now to FIG. 1, a computer system 100 is one suitable implementation of an computer system that may be a member of a cluster in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, a network interface 150, and a service processor interface 180. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Service processor interface 180 preferably connects the computer system 100 to a separate service processor 182. Service processor 182 preferably includes a server power-down mechanism 184 that allows servers coupled to the service processor to be individually powered-down. Service processor 182 typically provides an interface that allows a computer system (such as 100) to command the service processor to power down another computer system in the cluster. In addition, service processor 180 can terminate a single process on another machine when servers in the cluster are processes rather than physical boxes or logical partitions.

Main memory 120 in accordance with the preferred embodiments contains data 121, an operating system 122, and a cluster engine 123. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Cluster engine 123 provides for communication between computer systems in a cluster. Cluster engine 123 includes many features and mechanisms that are known in the art that support cluster communications but are not shown in FIG. 1. Cluster engine 123 includes a heartbeat mechanism 124 possibly over multiple channels, a membership change mechanism 125, and a quorum-based server power-down mechanism 126. The heartbeat mechanism 124 and membership change mechanism 125 are preferably known mechanisms in the art. Heartbeat mechanism 124 sends a periodic heartbeat message to other servers in the cluster, and receives periodic heartbeat messages from other servers in the cluster. These heart beats can be transmitted using a variety of channels such as network, serial cables or shared disk based heart beating. Membership change mechanism 125 monitors the membership in the cluster, and generates a membership change message to all servers in the cluster when one of the servers in the cluster becomes unresponsive (i.e., stops sending heartbeat messages). Quorum-based server power-down mechanism 126 allows a manager server to power down unresponsive servers, thereby assuring that the unresponsive servers do not become responsive in the future. The quorum-based server power-down mechanism 126 can only power down a server if the cluster has quorum, as discussed in more detail below with reference to FIG. 5.

In computer system 100 of FIG. 1, the quorum-based server power-down mechanism 126 is shown to be part of the cluster engine 123. This, however, is shown only as one possible implementation within the scope of the preferred embodiments. The quorum-based server power-down mechanism 126 could also be implemented separate from the cluster engine 123. The preferred embodiments expressly extend to any suitable location and implementation for the quorum-based server power-down mechanism 126.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and cluster engine 123 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, system bus 160, and service processor interface 180.

Although computer system 100 is shown to contain only a single system bus, those skilled in the art will appreciate that the present invention may be practiced using a computer system that has multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links.

Figure 2:
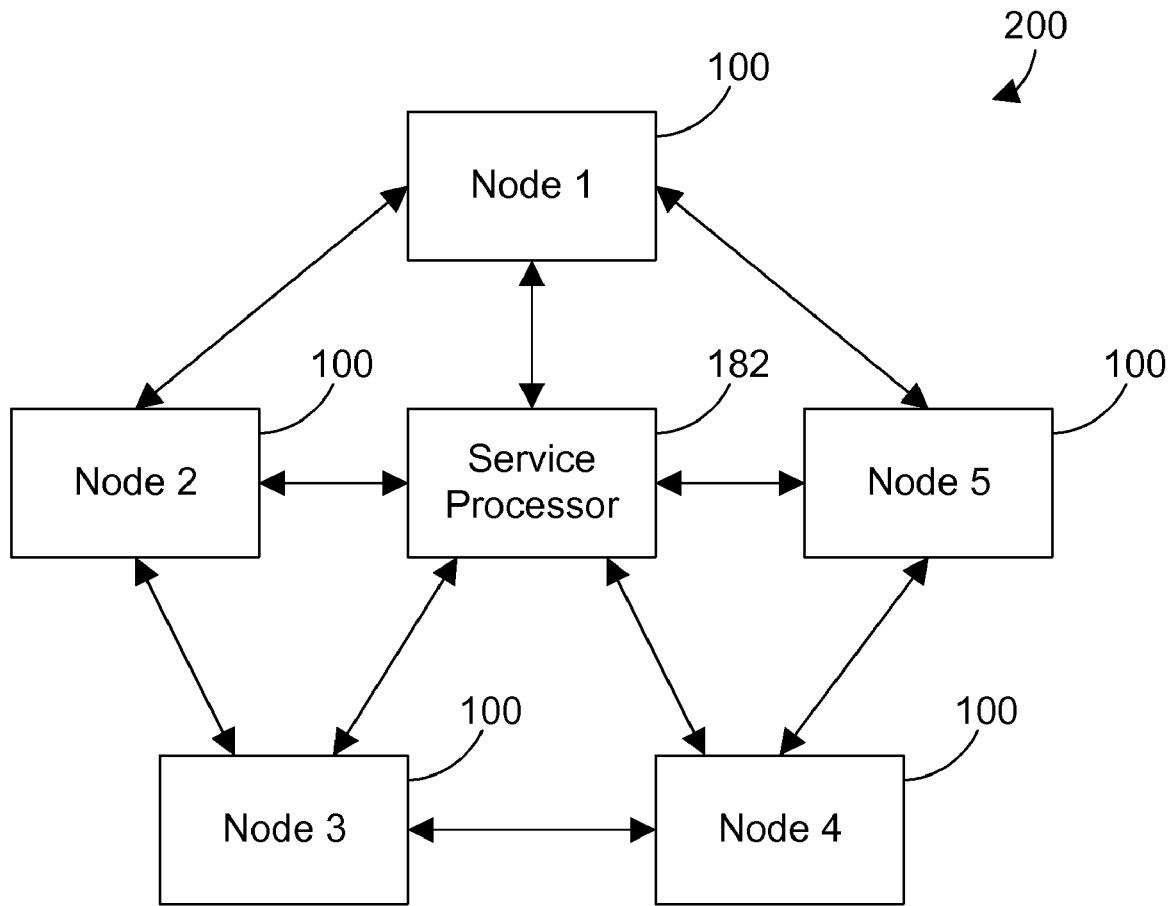
FIG. 2 is a block diagram of a cluster of computer systems shown in FIG. 1 in accordance with the preferred embodiments.

Referring to FIG. 2, a simple cluster 200 of five computer systems (or "nodes") is shown. Note that each node 100 in the cluster 200 is preferably a computer system 100 as shown in FIG. 1. However, one skilled in the art will recognize that different types of computer systems could be interconnected in a cluster. The connections between nodes in FIG. 2 represent logical connections, and the physical connections can vary within the scope of the preferred embodiments as long as the nodes in the cluster can logically communicate with each other. Each node 100 is connected to a service processor 182. The service processor 182 preferably includes logic that allows for individually powering down each server on each node. When a node in cluster 200 becomes unresponsive, the quorum-based server power-down mechanism 126 in a manager server gives one or more commands to the service processor 182 to power down one or more of the servers in the cluster 200. The service processor 182, in response to the command(s) from the manager server, powers down the one or more servers in the cluster. Note that the term "power down" and "powering down" denotes removing power to the server, but can also denote simply putting the server in a non-functional state using any suitable mechanism or means. For example, the service processor 182 could simply assert and hold a hard reset signal to a node that needs to be powered down. As long as the reset signal is asserted, the node cannot power up. If a server is located in a logical partition on an apparatus that includes other servers in the cluster in one or more other logical partitions that are still responsive, the apparatus cannot be physically powered down because this would reset the responsive servers as well. However, the service processor can assert a signal or provide a command that causes the server that needs to be powered off to instead shut down. Thus, the term "power down" and "powering down" as used in this specification and claims means any way, whether currently known or developed in the future, for putting a server in an unresponsive state until a supervisor determines that the server may be powered back up. In addition, these terms could also refer to simply restarting the server. A service processor may also be more fine grained, and if the members of the cluster were processes rather than physical boxes or logical partitions, then the powering down of the server may be the simple step of guaranteeing the server process was terminated.

Figure 3:
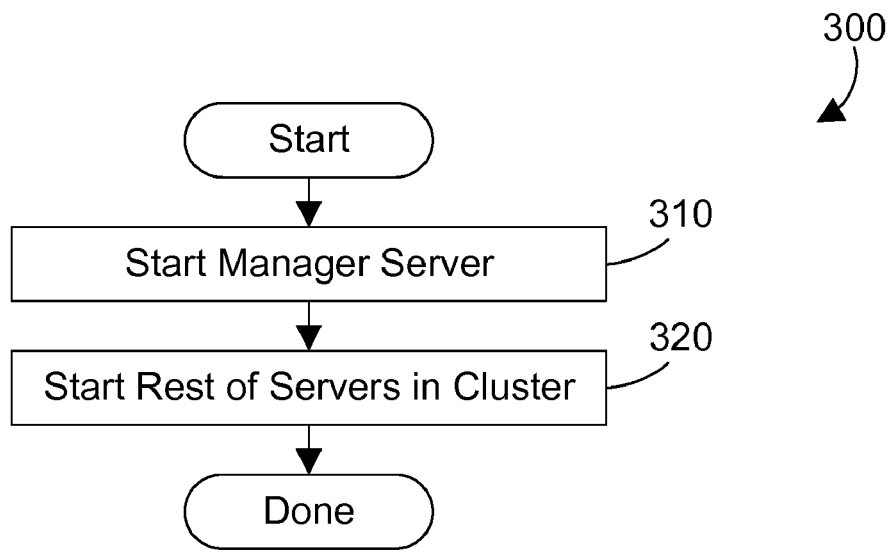
FIG. 3 is a flow diagram of a method in accordance with the preferred embodiments for powering up servers in a cluster.

Referring to FIG. 3, a method 300 is a method in accordance with the preferred embodiments for initially powering up servers in a cluster. The manager server is powered up first (step 310). This is done because the algorithms for powering down boxes when the manager server moves can reset boxes that are in the process of starting. This makes the initial bring up of the cluster much smoother. The rest of the servers in the cluster may then be powered up (step 320). For the sake of simplicity, in method 300 we assume there is a single manager server for a cluster. However, one skilled in the art will realize that multiple managers could be defined for a cluster, with an arbitration scheme to determine which manager is responsible for performing management duties at any particular point in time. In the case of multiple manager servers, all manager servers are started in step 310, followed by the servers that are not managers in step 320.

Figure 5:
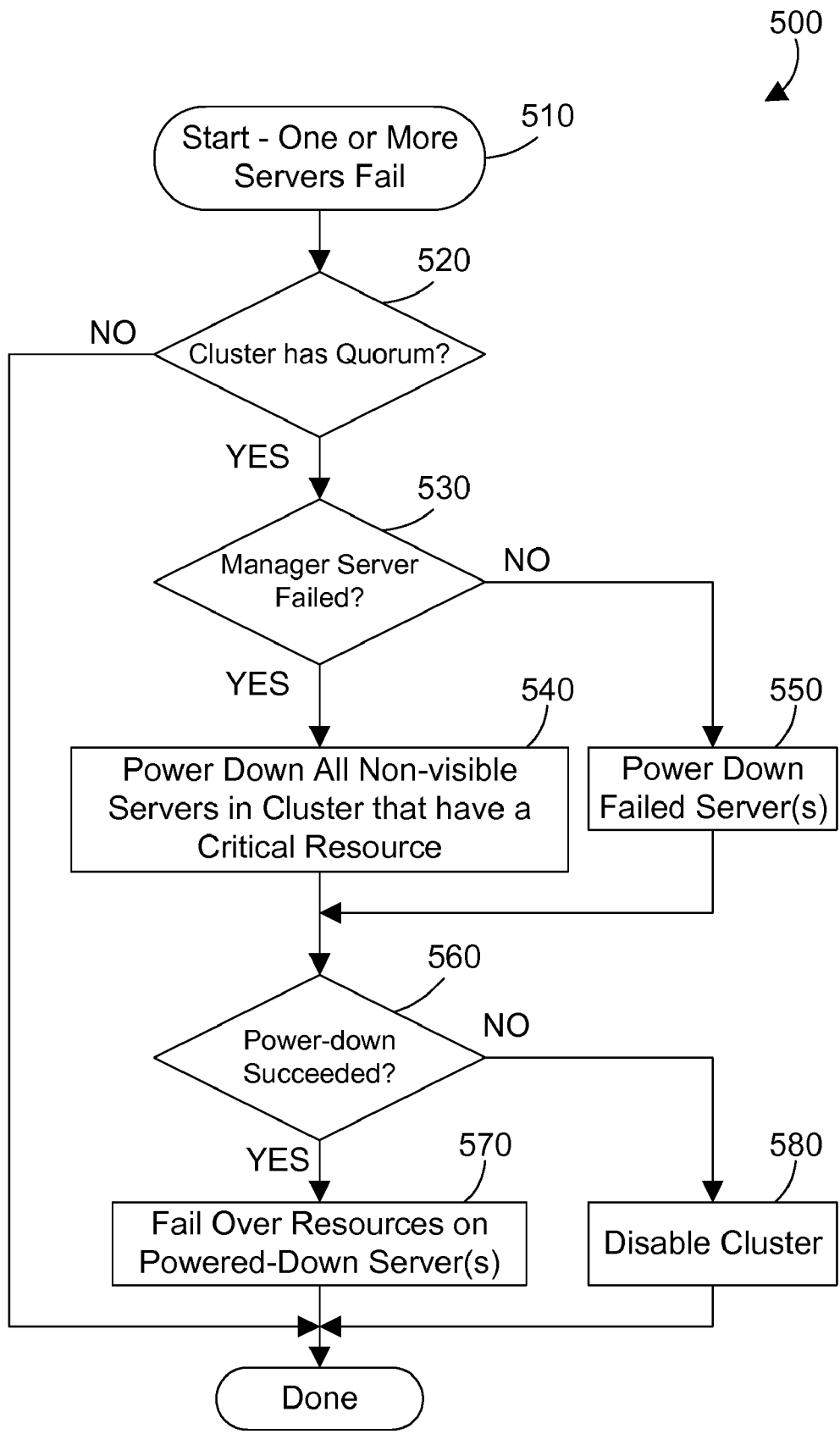
FIG. 5 is a flow diagram of a method in accordance with the preferred embodiments for powering down unresponsive servers in a computer cluster before failing over the resources of the failed servers.

FIG. 5 shows one specific method 500 that is preferably performed by the quorum-based server power-down mechanism 126 in FIG. 1 in accordance with the preferred embodiments. Method 500 begins when one or more servers in the cluster fail (step 510). If the cluster does not have quorum (step 520=NO), method 500 is done. The cluster has quorum if the cluster contains a majority of the servers in the cluster. Thus, a cluster with seven servers that has three of the servers fail still has quorum, but if four servers fail, the remaining cluster no longer has quorum. If the number of possible servers is even then one server is given two votes and acts as a tiebreaker. One skilled in the art can determine other techniques for creating tiebreakers. If the cluster has quorum (step 520=YES), method 500 determines whether a manager server failed (step 530). Step 530 does not simply test to see if a manager has ever failed, but more specifically tests to see if a manager server is one of the servers that failed to start method 500 in step 510. If the manager server failed in step 510 (step 530=YES), all non-visible servers in the cluster that have a critical resource are powered down (step 540). A server is non-visible in the cluster (i.e., unresponsive) if it has stopped sending heartbeat messages, or if it has been partitioned from the cluster. If no manager server failed (step 530=NO), method 500 powers down the servers that failed in step 510 that currently are potential owners of any quorum protected resource. This check is critical as it allows a server process to be shutdown cleanly and it won't be powered down as a result. The difference between steps 540 and 550 is simply this: if a manager fails, we don't necessarily know which failed node used to be the manager, so we must power down all unresponsive servers in the cluster (step 540) to avoid the manager coming back alive in the future. If the manager does not fail, only the failed servers that can potentially own a quorum protected resource need to be powered down (step 550).

If the power-down operation succeeded (step 560=YES)), the resources on the failed server(s) may be failed over to servers in the cluster that are still responsive (step 570). The concept of failing over resources from a dead server to a live server in the cluster is well-known in the art, and therefore need not be discussed in further detail here. The failing over of resources is the process of making these same resources available on a different server in the cluster. This is the very nature of one specific way to provide highly-reliable services, using multiple servers that can take over for each other when one of the servers fails. If the power-down operation did not succeed (step 560=NO), the cluster is disabled (step 580). The preferred embodiments depend on the service processor doing its job of powering down a selected server when the quorum-based server power-down mechanism sends the command to power down the selected server. If the service processor is unable to perform its power-down function, this means there is a problem with the service processor itself or something else that requires intervention by a system administrator. Thus, once a cluster is disabled in step 580, a system administrator is preferably notified of the problem so the system administrator can take appropriate action to correct the problem.

With an understanding of method 500 in FIG. 5, we now understand why it is necessary to power up the manager server first in method 300 of FIG. 3 before powering up the other servers. Let's assume a manager server B was powered up after another server A is powered up. In this scenario, when A powers up, it will assume it is the manager. When server C powers up, it will detect a change in manager server, which it will interpret as a failure of the previous manager, and will power down all non-visible servers. These non-visible servers may be in the process of powering up, and each time the manager changes, they are effectively killed off before they can complete the power-up sequence. By requiring the manager server to be powered up first (step 310), followed by the other servers (step 320), this type of undesirable behavior is avoided.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while a known service processor is shown as one possible mechanism for powering down servers, other mechanisms could also be used within the scope of the preferred embodiments. For example, addressable power strips could be used that are capable of receiving commands, and shutting off power to a particular plug in the power strip or to the entire power strip. Any mechanism for putting a server in an unresponsive state until some step of intervention is taken falls within the scope of the term "service processor" as used herein. In addition, the servers recited herein may reside within logical partitions, which means that the power down of a server in a logical partition implies simply shutting down the logical partition.

The invention claimed is:

1. A computer-implemented method for handling an unresponsive server in a cluster, the method comprising the steps of:
   each server in the cluster sending a periodic message to other servers in the cluster to indicate proper function of the server sending the periodic message;
   each server in the cluster receiving periodic messages from other servers in the cluster that indicate the other servers in the cluster are functioning properly;
   generating a membership change message to all servers in the cluster when any of the servers in the cluster become unresponsive;
   determining whether the cluster has quorum, wherein a cluster has quorum when a majority of servers in the cluster are responsive, wherein in determining the majority of servers, if there is an odd number of servers in the cluster, each server in the cluster counts as one server, and if there is an even number of servers in the cluster, each server in the cluster that is not a manager of the cluster counts as one server and the manager of the cluster counts as two servers;
   receiving an indication of a server failure;
   if the majority of servers in the cluster are responsive, performing the steps of:
      determining whether the indication of the server failure indicates the manager of the cluster failed;
      if the manager of the cluster failed, issuing at least one command to power down all unresponsive servers in the cluster, wherein a server is powered down when the server will not become responsive in the future, wherein an unresponsive server is a server that fails to send a periodic message that indicates the server is functioning properly;
      if the manager of the cluster did not fail, issuing at least one command to power down a server corresponding to the received indication of server failure;
      determining whether the power down of the at least one of the other servers was successful;
      if the power down of the at least one of the other servers was successful, enabling the failing over any resources on the at least one of the other servers that was powered down to at least one server that is responsive; and
      if the power down of the at least one of the other servers was not successful, disabling the cluster.

2. An apparatus comprising:
   (A) at least one processor;
   (B) a memory coupled to the at least one processor;
   (C) a server process residing in the memory and executed by the at least one processor, wherein the server process resides in a logical partition defined on the apparatus;
   (D) a cluster engine residing in the memory and executed by the at least one processor, the cluster engine handling communications between the server process and other servers in a cluster, the cluster engine comprising:
      (D1) a heartbeat mechanism that sends a periodic message to the other servers in the cluster to indicate the server process is functioning properly and that receives periodic messages from the other servers in the cluster that indicate the other servers in the cluster are functioning properly;
      (D2) a membership change mechanism that generates a membership change message to all servers in the cluster when any of the servers in the cluster become unresponsive;

(E) a quorum-based server power-down mechanism residing in the memory and executed by the at least one processor, the quorum-based server power-down mechanism determining whether the server process is part of a group of servers that has quorum in the cluster, wherein a cluster has quorum when a majority of servers in the cluster are responsive, wherein in determining the majority of servers, if there is an odd number of servers in the cluster, each server in the cluster counts as one server, and if there is an even number of servers in the cluster, each server in the cluster that is not a manager of the cluster counts as one server and the manager of the cluster counts as two servers, and if so, the quorum-based server power-down mechanism determining whether the manager of the cluster failed when an indication of a server failure is received, and if the manager of the cluster failed, the quorum-based server power-down mechanism issues at least one command to power down all unresponsive servers in the cluster, wherein a server is powered down when the server will not become responsive in the future, wherein an unresponsive server is a server that fails to send a periodic message that indicates the server is functioning properly, and if a manager of the cluster did not fail, the quorum-based server power-down mechanism issues at least one command to power down a server corresponding to the received indication of server failure, wherein the quorum-based server power-down mechanism determines whether the power down of the at least one of the other servers was successful, and if the power down of the at least one of the other servers was successful, the quorum-based server power-down mechanism enables failing over any resources on the at least one of the other servers that was powered down to at least one server that is responsive, and if the power down of the at least one of the other servers was not successful, the quorum-based server power-down mechanism disables the cluster; and (F) a service processor that receives the command, and in response, powers down at least one of the other servers.

3. A computer readable recordable media bearing a computer program, the computer program comprising:

(A) a cluster engine that handles communications between a plurality of servers in a cluster, wherein at least one server in the cluster resides in a logical partition, the cluster engine comprising:

(A1) a heartbeat mechanism that sends a periodic message to other servers in the cluster to indicate the server process is functioning properly and that receives periodic messages from the other servers in the cluster that indicate the other servers in the cluster are functioning properly;

(A2) a membership change mechanism that generates a membership change message to all servers in the cluster when any of the servers in the cluster become unresponsive; and (A3) a quorum-based server power-down mechanism residing in the memory and executed by the at least one processor, the quorum-based server power-down mechanism determining whether the server process is part of a group of servers that has quorum in the cluster, wherein a cluster has quorum when a majority of servers in the cluster are responsive, wherein in determining the majority of servers, if there is an odd number of servers in the cluster, each server in the cluster counts as one server, and if there is an even number of servers in the cluster, each server in the cluster that is not a manager of the cluster counts as one server and the manager of the cluster counts as two servers, and if so, the quorum-based server power-down mechanism determining whether the manager of the cluster failed when an indication of a server failure is received, and if the manager of the cluster failed, the quorum-based server power-down mechanism issues at least one command to power down all unresponsive servers in the cluster, wherein a server is powered down when the server will not become responsive in the future, wherein an unresponsive server is a server that fails to send a periodic message that indicates the server is functioning properly, and if a manager of the cluster did not fail, the quorum-based server power-down mechanism issues at least one command to power down a server corresponding to the received indication of server failure, wherein the quorum-based server power-down mechanism determines whether the power down of the at least one of the other servers was successful, and if the power down of the at least one of the other servers was successful, the quorum-based server power-down mechanism enables failing over any resources on the at least one of the other servers that was powered down to at least one server that is responsive, and if the power down of the at least one of the other servers was not successful, the quorum-based server power-down mechanism disables the cluster.

* * * * *